(12) United States Patent
Boon

(10) Patent No.: US 6,351,565 B1
(45) Date of Patent: *Feb. 26, 2002

(54) DATA STRUCTURE FOR IMAGE TRANSMISSION, METHOD OF IMAGE TRANSMISSION, IMAGE DECODING APPARATUS, AND DATA RECORDING MEDIA

(75) Inventor: Choong Seng Boon, Moriguchishi (JP)

(73) Assignee: Matsushita Electric Industrial Co, Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,394

(22) Filed: Feb. 4, 1998

(30) Foreign Application Priority Data

Feb. 7, 1997 (JP) ............................... 9-024916

(51) Int. Cl.$^7$ ................................................ G06K 9/36
(52) U.S. Cl. ...................................................... 382/236
(58) Field of Search ............................... 382/118, 232, 382/239, 241, 242, 243, 235; 345/430, 441, 445, 202, 428, 435; 395/683, 685; 707/101, 102, 103; 348/384, 390, 399, 405, 415, 416, 420, 421, 422, 426, 429, 716

(56) References Cited

U.S. PATENT DOCUMENTS

| | | | |
|---|---|---|---|
| 4,606,069 A | * | 8/1986 | Johnsen ....................... 382/243 |
| 4,783,841 A | * | 11/1988 | Crayson ....................... 382/243 |
| 4,888,812 A | * | 12/1989 | Dinan et al. ................. 382/305 |
| 4,969,049 A | * | 11/1990 | Mitani et al. ................ 382/305 |
| 4,996,714 A | * | 2/1991 | Desjardins et al. .......... 382/305 |
| 5,058,185 A | * | 10/1991 | Morris et al. ................ 382/305 |
| 5,109,439 A | * | 4/1992 | Froessl ........................ 382/305 |
| 5,206,915 A | * | 4/1993 | Kern et al. .................. 382/305 |
| 5,214,721 A | * | 5/1993 | Fukuhara et al. ........... 382/243 |

(List continued on next page.)

FOREIGN PATENT DOCUMENTS

| | | |
|---|---|---|
| JP | 6-195880 | 7/1994 |
| JP | 8-77755 | 3/1995 |

OTHER PUBLICATIONS

Research Report of Information Processing Society of Japan, 96–AVM–12, Feb. 16, 1996, "Audio Visual Composite Information Processing, 12–5".

Primary Examiner—Jose L. Couso
(74) Attorney, Agent, or Firm—Parkhurst & Wendel, L.L.P

(57) ABSTRACT

In a data structure for coding and transmitting digital image signals corresponding to plural objects constituting a moving picture, a coded image signal obtained by coding the digital image signal corresponding to each object includes display information for image display of the corresponding object, and locational information showing the location of relevant data relating to the corresponding object. Theretore, the user can access relevant data of a desired object by only specifying the object on the display screen of the moving picture. As a result, controllability in accessing relevant data is improved. Further, since the display information of each object and the locational information of relevant data of the object are united, the locational information of relevant data can be managed by managing the display information, whereby management of the locational information of relevant data is facilitated. Further, since the locational information of relevant data of each object is transmitted simultaneously with transmission of the display signal of the object, loss of relevant data due to transmission error is significantly reduced.

20 Claims, 9 Drawing Sheets

U.S. PATENT DOCUMENTS

| | | | | |
|---|---|---|---|---|
| 5,247,590 A | * | 9/1993 | Fukuhara et al. | 382/243 |
| 5,500,673 A | * | 3/1996 | Zhou | 382/118 |
| 5,581,481 A | * | 12/1996 | Weerackody et al. | 382/305 |
| 5,586,316 A | * | 12/1996 | Tanaka et al. | 382/305 |
| 5,635,929 A | * | 6/1997 | Rabowsky et al. | 341/50 |
| 5,680,512 A | * | 10/1997 | Rabowsky et al. | 395/2.95 |
| 5,708,473 A | * | 1/1998 | Mead | 348/416 |
| 5,748,789 A | * | 5/1998 | Lee et al. | 382/243 |
| 5,764,808 A | * | 6/1998 | O'Connell et al. | 382/243 |
| 5,825,830 A | * | 10/1998 | Kopf | 382/239 |
| 5,861,920 A | * | 1/1999 | Mead et al. | 348/390 |
| 5,864,862 A | * | 1/1999 | Kriens et al. | 707/103 |
| 5,926,575 A | * | 7/1999 | Ohzeki et al. | 382/243 |

* cited by examiner

DATA STRUCTURE FOR IMAGE TRANSMISSION, METHOD OF IMAGE TRANSMISSION, IMAGE DECODING APPARATUS, AND DATA RECORDING MEDIA

FIELD OF THE INVENTION

The present invention relates to data structures for image transmission, methods of image transmission, image decoding apparatus, and data recording media. More particularly, the invention relates to a data structure of a coded image signal which corresponds to each of objects constituting a moving picture and includes locational information of data relating to the object, a method of transforming an image signal of each object into a coded image signal having the data structure and transmitting the image signal, an apparatus for decoding a coded image signal of the data structure, and a data recording medium which contains a program for performing the image transmission method or a program for performing image processing by the image decoding apparatus.

BACKGROUND OF THE INVENTION

In order to store or transmit digital image information with high efficiency, it is necessary to compressively encode the digital image information. As a typical method of compressive coding of digital image information, there is discrete cosine transformation (DCT) represented by JPEG (Joint Photographic Experts Group) and MPEG (Moving Picture Experts Group). Besides the DCT, there are waveform coding methods such as sub-band coding, wavelet coding, and fractal coding.

Further, in order to eliminate redundant image information between images, such as adjacent frames, inter-frame prediction using motion compensation is carried out. In this method, a pixel value of a pixel in the present frame is represented by a difference between this pixel value and a pixel value of a pixel in the previous frame, and this difference signal is subjected to waveform coding.

A method or compressively coding and transmitting an image signal in objects units has recently been put to practical use. To be specific, plural objects constituting a frame are individually subjected to compressive coded and transmitted so that reproduction of the image signal can be carried out in regions corresponding to the respective objects.

In this method, on the reproduction end, coded image signals corresponding to the respective objects are decoded, and the decoded images of the respective objects are synthesized to display an image corresponding to one frame. This object-by-object coding enables the user to freely combine images of objects to be displayed, whereby edition of a moving picture is facilitated.

Furthermore, in the above-mentioned, it is possible to display a moving picture without reproducing images of relatively unimportant objects, according to the busyness of transmission line, the performance of reproduction apparatus, and the tastes of viewer.

Moreover, in the above-mentioned method, scalability in objects units, i.e., a hierarchical processing, is realized. In the hierarchical processing, image signals corresponding to plural hierarchies and having different resolutions are used as image signals corresponding to the respective objects, and coding or decoding of an image signal of each hierarchy is carried out using an image signal of another hierarchy.

In recent years, an image supply system that enables the user to access moving pictures through computer network, has been spread.

FIG. 9 is a schematic diagram for explaining such an image supply system.

In an image supply system 700 shown in FIG. 9, a plurality of networks 701, 702 and 703 are connected to each other, and a plurality of servers 705, 706 and 707 for supplying image information are connected to the networks 701, 702 and 703, respectively. Further, a plurality of terminal units for receiving and reproducing images (hereinafter referred to simply as "terminal units") are connected to the respective networks 701~703. To simplify the description, only a terminal unit 704 connected to the network 701 is shown in FIG. 9.

In the image supply system so constructed, when the terminal unit 704 is supplied with image information from the server 705, initially, the terminal unit 704 contacts the server 705 and forms a line connecting the terminal unit 704 with the server 705. Thereafter, the terminal unit 704 receives image data of a predetermined program supplied from the server 705, and reproduces the image data by decoding.

Further, in order to make the terminal unit 704 able to receive data relating to the received image data, i.e., the program (hereinafter referred to as relevant data), locational information showing resource locations of the relevant data is described in a text file corresponding to an image file in which the image data is described. The text file and the image file have different formats. Accordingly, the user can obtain the relevant data of the program received by the terminal unit according to the locational information described in the text file.

For example, Internet, being an image supply system as mentioned above, employs Hypertext files. Described in the text files are character groups and locational information showing resource locations of other data relating to the character groups (relevant data). When the user selects a specific character group, data relating to the selected character group is supplied from a prescribed server. That is, these character groups are linked to other documents, such as text file, program file, and graphic file.

In the current Internet, with respect to moving pictures, locational information of data relating to a moving picture is described in a Hypertext file corresponding to the moving picture, thereby to specify where the moving picture is linked.

Hereinafter, a detailed description is given using FIGS. 10(*a*)–10(*c*).

A plurality of information sources are connected to the current Internet serving as an information supply system. Each information source contains, as Hypertext files, home pages relating to various kinds of subjects. Now it is assumed that the terminal unit 704 is connected to an information source having a home page (HP) whose title is "World of Dinosaurs" and this home page HP (Hypertext file screen HTs) is displayed on a display of the terminal unit 704.

In this home page HP, as shown in FIG. 10(*a*), items of moving pictures relating to dinosaurs are represented by character groups "scene 1"~"scene 3". With respect to objects constituting a moving picture of each item, for example, "scene 1", relevant data relating to objects ob1 and ob2 are represented by character groups "object 1" and "object 2", respectively. The display areas of these character groups are moving picture specifying areas D1~D3 and relevant data specifying area D11 and D12.

The displayed content of this home page HP is described in a Hypertext file Hf corresponding to the home page. To be specific, as shown in FIG. 10(b), character groups "scene 1" m1~"scene 3" m3 and location data b1~b3 showing the locations of moving pictures data corresponding to the respective scenes are described in pairs, and character groups "object 1" m11 and "object 2" m12 and locational data b11 and B12 showing the locations of relevant data relating to the respective objects are described in pairs.

When the user moves a mouse pointer MP to the area D1 corresponding to the character group "scene 1" on the home page HP and clicks the mouse, a new display screen MPs showing moving picture data linked to the character group "scene 1" is opened as a screen of moving picture MI. On the moving picture screen MPs, displayed are two objects ob1 and ob2 and display control buttons CB1~CB4 for controlling the moving picture display. The user can control display of the moving picture by operating the display control buttons CB1~CB4 with the mouse pointer MP.

When the user wants to see the moving picture corresponding to the character group "scene 2" or "scene 3", the user moves the mouse pointed MP from the screen MPs of the moving picture MI to the area D2 or D3 corresponding to "scene 2" or "scene 3" on the home page HP and clicks the mouse, whereby a new display screen showing moving picture data linked to "scene 2" or "scene 3" is opened as a moving picture screen.

Furthermore, when the user wants to retrieve the relevant data of the object ob1 being a constituent of the moving picture MI of "scene 1", the user moves the mouse pointer MP from the moving picture screens MPs to the area D11 corresponding to the character group "objects 1" on the home page HP and clicks the mouse, whereby the relevant data of the object ob1 lined to the "object 1" is displayed.

However, when accessing the moving picture data corresponding to the respective scenes through the Hypertext file HP as mentioned above, it is necessary to move the mouse pointer MP between the screen MPs of the moving picture MI and the Hpertext screen HTs (home page HP). Therefore, at least two screens, i.e., the moving picture screen MPs and the Hypertext screen HTs, must be displayed on the display of the terminal unit 704. Or, display switching between the screen MPs and the screen HTs must be carried out on the display.

Further, locational information showing resource locations of relevant data relating to the object that appears in each scene (for example, when the object is a dinosaur, its figure, habitat and the like) is also described in the Hypertext file. So, when retrieving the relevant data, the user must move the mouse pointer MP from the screen MPs of the moving picture MI to the Hypertext file screen HTs.

Particularly, in the above-mentioned object-by-object coding and decoding method, a picture consists of a plurality of objects, i.e., sub-pictures, and each object has relevant data and, moreover, the relevant data of the respective objects are stored in different servers.

For example, assuming that the relevant data of the objects ob1 and ob2 constituting the moving picture M1 are respectively stored in the servers 706 and 707 shown in FIG. 9, when the user accesses the relevant data corresponding to the object ob1 (ob2), the user must access the relevant data stored in the server 706 (707) from the screen MPs of the moving picture MI showing these objects via the corresponding Hypertext file screen HTs, resulting in poor operability in accessing the relevant data. Furthermore, in this case, it is difficult to manage the locational information of the relevant data corresponding to the respective objects. That is, when one of the objects constituting the moving picture is changed, it is necessary to change the description about locational information of relevant data of the object changed in the Hypertext file.

Furthermore, when information described in the Hypertext file is lost due to transmission error, the locational information of the relevant data of the respective objects constituting the moving picture is lost as well, and the user cannot access the relevant data of the objects using only the moving picture data described in the image file.

SUMMARY OF THE INVENTION

It is an object of the present invention to provide a data structure for image transmission and an image transmission method that can improve the operability in accessing relevant data of plural objects constituting an image, that can facilitate management of locational information of the relevant data corresponding to the respective objects, and that can prevent the relevant data of the respective objects from being lost due to transmission error.

It is another object of the present invention to provide a data recording medium that contains a program for implementing, by software, image processing according to the above-mentioned image transmission method or image decoding apparatus.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the invention, there is provided a data structure for coding and transmitting digital image signals corresponding to plural objects constituting a moving picture, wherein a coded image signal obtained by coding the digital image signal corresponding to each object includes display information for image display of the corresponding object, and locational information showing the location of relevant data relating to the corresponding object. Therefore, the user can access relevant data of a desired object by only specifying the object on the display screen of the moving picture. As a result, controllability in accessing relevant data is improved. Further, since the display information of each object and the locational information of relevant data of the object are united, the locational information of relevant data can be managed by managing the display information, whereby management of the locational information of relevant data is facilitated. Further, since the locational information of relevant data of each object is transmitted simultaneously with transmission of the display signal of the object, loss of relevant data due to transmission error is significantly reduced.

According to a second aspect of the invention, there is provided a method of transmitting digital image signals corresponding to plural objects constituting a moving picture, and the method includes the steps of generating a coded image signal by coding the image signal corresponding to each object; and transmitting the coded image signal corresponding to each object after adding locational information showing the location of relevant data of the object to the coded image signal. Therefore, as described above, controllability in accessing relevant data corresponding to each object is improved, and management of the locational information of relevant data is facilitated. Further, loss of relevant data due to transmission error is almost avoided.

According to a third aspect of the invention, there is provided an image decoding apparatus which receives a coded image signal obtained by coding digital image signals corresponding to plural objects constituting a moving picture, the coded image signal including display information for image display of the respective objects and locational information showing locations of relevant data relating to the respective objects, and performs a prescribed decoding process to the coded image signal. The apparatus includes transmission means for transmitting an access signal for accessing the relevant data to an information source where the relevant data is located, according to the locational information of the relevant data; and a decoding unit for decoding the display information. Therefore, as described above, controllability in accessing relevant data corresponding to each object is improved, and management of the locational information of relevant data is facilitated. Further, loss of relevant data due to transmission error is almost avoided.

According to a fourth aspect of the invention, in the image decoding apparatus according to the third aspect, a coded bit stream constituting the coded image signal corresponding to each object has a data structure in which a location bit string constituting the locational information of relevant data is given to every L display bit strings constituting the display information and corresponding to L frames (L: integer, $L \geq 1$). Therefore, relevant data that vary according to the motion of the object can be obtained by simple operation on the display screen.

According to a fifth aspect of the invention, in the image decoding apparatus according to the third aspect, a coded bit stream constituting the coded image signal corresponding to each object comprises a plurality of display bit strings constituting the display information corresponding to each object, and a location bit string constituting the locational information of relevant data corresponding to each object, the location bit string being located at the head to the coded bit stream. Therefore, when transmitting the coded image signal, the locational information of relevant data corresponding to the object is transmitted first, so that the locational information is avoided from being lost due to transmission error.

According to a sixth aspect of the invention, there is provided an image decoding apparatus which receives a coded image signal obtained by coding digital image signals corresponding to plural objects constituting a moving picture, the coded image signal including display information for image display of the respective objects and table information comprising object identifiers for identifying the respective objects and locational information showing the location of relevant data relating to the objects, and performs a prescribed decoding process to the coded image signal. The apparatus includes transmission means for transmitting an access signal for accessing the relevant data to an information source where the relevant data is located, according to the locational information of the relevant data; and a decoding unit for decoding the display information. Therefore, locational information of relevant data of all the objects constituting the moving picture can be obtained from the table information.

According to a seventh aspect of the invention, there is provided an image decoding apparatus which receives a coded image signal obtained by coding digital image signals corresponding to plural objects constituting a moving picture, the coded image signal including display information for image display of the respective objects and composition information used for composition of plural objects, and performs a prescribed decoding process to the coded image signal. The apparatus includes transmission means for transmitting an access signal for accessing the relevant data to an information source where the relevant data is located, according to locational information of the relevant data, the locational information being included in the composition information corresponding to each object together with an object identifier for identifying the object; and a decoding unit for decoding the display information. Therefore, relevant data of the respective objects can be obtained according to the composition information.

According to an eighth aspect of the invention, there is provided a data structure for coding and transmitting digital signals corresponding to plural pieces of individual information constituting a single information group, wherein a coded signal obtained by coding the digital signal corresponding to each individual information includes a reproduction signal for reproducing the corresponding individual information, and locational information showing the location of relevant data relating to the corresponding individual information. Therefore, controllability in accessing relevant data corresponding to each object is improved, and management of the locational information of relevant data is facilitated. Further, loss of relevant data due to transmission error is almost avoided.

According to a ninth aspect of the invention, there is provided a data recording medium containing a program for making a computer perform an image signal transmission, wherein the program is constructed so that the computer performs an image signal transmission according to the image transmission method of the second aspect. Therefore, it is possible to realize, by a computer, an image transmission process that improves controllability in accessing relevant data of objects, that facilitates management of locational information of relevant data, and that hardly produces loss of relevant data due to transmission error.

According to a tenth aspect of the invention, there is provided a data recording medium containing a program for making a computer perform an image signal transmission, wherein the program is constructed so that the computer performs an image signal transmission according to the image transmission method of the third aspect. Therefore, it is possible to realize, by a computer, an image decoding process that provides high controllability in accessing relevant data of objects constituting a moving picture.

According to an eleventh aspect of the invention, there is provided a data structure for coding and transmitting digital image signals corresponding to plural objects constituting a moving picture, wherein a coded image signal obtained by coding the digital image signal corresponding to each object includes display information for image display of the corresponding object, and locational information showing the location of the display information. Therefore, on the receiving end, the user can access the information source of display information of each object by receiving at least the locational information of the display information. So, image display of each object can be performed without the display information of the object.

According to a twelfth aspect of the invention, there is provided a method of transmitting digital image signals corresponding to plural objects constituting a moving picture, and the method includes the steps of generating a coded image signal by coding the image signal corresponding to each object; and transmitting the coded image signal corresponding to each object after adding locational information showing the location of display information for displaying the object to the coded image signal. Therefore, on the receiving end, the user can access the information source of display information of each object by receiving at least the locational information of the display information. So, image display of each object can be performed without the display information of the object.

According to a thirteenth aspect of the invention, there is provided an image decoding apparatus which received a coded image signal obtained by coding digital image signals corresponding to plural objects constituting a moving picture, the coded image signal including display information for image display of the respective objects and locational information showing the location of the display information, and performs a prescribed decoding process to the coded image signal. The apparatus includes transmission means for transmitting an access signal for accessing the display information to an information source where the display information is located, according to the locational information of the display information; and a decoding unit for decoding the display information. Therefore, the user can access the information source of display information of a specific object as desired according to the locational information of the display information. As a result, on the receiving end, edition of the moving picture is facilitated.

According to a fourteenth aspect of the invention, in the image decoding apparatus according to the thirteenth aspect, a coded bit stream constituting the coded image signal corresponding to each object has a data structure in which a location bit string constituting the locational information of the display information is given to every L display bit strings constituting the display information and corresponding to L frames (L: integer, L≧1). Therefore, relevant data of display information of the object are received with high reliability.

According to a fifteenth aspect of the invention, in the image decoding apparatus according to the thirteenth aspect, a coded bit stream constituting the coded image signal corresponding to each object comprises a plurality of display bit strings constituting the display information corresponding to each object, and a location bit string constituting the locational information of the display information of each object, which location bit string is located at the head of the coded bit stream. Therefore, when transmitting the coded image signal, the locational information of display information of the object is transmitted first, so that the locational information of display information is avoided from being lost due to transmission error.

According to a sixteenth aspect of the invention, there is provided an image decoding apparatus which receives a coded image signals obtained by coding digital image signals corresponding to plural objects constituting a moving picture, the coded image signal including display information for image display of the respective objects and table information comprising object indentifiers for identifying the respective object and locational information showing the location of the display information, and performs a prescribed decoding process to the coded image signal. The apparatus comprises transmission means for transmitting an access signal for accessing the display information to an information source where the display information is located, according to the locational information of the display information; and a decoding unit for decoding the display information. Therefore, locational information of display information of all the objects constituting the moving picture can be obtained from the table information. On the receiving side, the user can access the information source of display information of each object according to the table information alone to display the moving picture comprising the plural objects.

According to a seventeenth aspect of the invention, there is provided an image decoding apparatus which receives a coded image signal obtained by coding digital image signals corresponding to plural objects constituting a moving picture, the coded image signal including display information for image display of the respective objects and composition information used for composition of plural objects, and performs a prescribed decoding process to the coded image signal. The apparatus comprises transmission means for transmitting an access signal for accessing the display information to an information source where the display information is located, according to locational information showing the location of the display information of each object, the locational information being included in the composition information corresponding to each object together with an object identifier for identifying the object; and a decoding unit for decoding the display information. Therefore, on the receiving end, the user can obtain display information of a desired object from its information source according to the composition information alone. For example, when a coded image signal of a moving picture sent from an artificial satellite is transmitted through a relay center to a local station, locational information of display information of a specific object (commercial) included in composition information of the coded image signal is changed to one corresponding to the local station in the relay center, whereby a moving picture including a commercial suited to the area of the local station can be reproduced in the local station.

According to an eighteenth aspect of the invention, there is provided a data structure for coding and transmitting digital signals corresponding to plural pieces of individual information constituting a single information group, wherein a coded signal obtained by coding the digital signal corresponding to each individual information includes a reproduction signal for reproducing the corresponding individual information, and locational information showing the location of the reproduction signal of the corresponding individual information. Therefore, on the receiving end, the user can access the information source of the reproduced signal of each individual information by receiving at least the locational information of the reproduced signal of the individual information. So, reproduction of each individual information can be performed without the reproduction signal of the individual information.

According to a nineteenth aspect of the invention there is provided a data recording medium containing a program for making a computer perform an image signal transmission, wherein the program is constructed so that the computer performs an image signal transmission according to the image transmission method of the twelfth aspect. Therefore, it is possible to realize, by a computer, an image transmission process that can access the information source of display information of each object by receiving at least the locational information of the display information on the receiving end and that can perform image display of each object without the display information of the object.

According to a twentieth aspect of the invention, there is provided a data recording medium containing a program for making a computer perform an image signal transmission, wherein the program is constructed so that the computer performs an image signal transmission according to the image transmission method of the thirteenth aspect. Therefore, it is possible to realize, by a computer, an image decoding process that can access the information source of display information of a specific object according to the locational information of the display information and that can facilitate edition of the moving picture on the receiving end.

BRIEF DESCRIPTION OF THE DRAWINGS

FIGS. 1(a)–1(c) are diagrams for explaining an image transmission method according to a first embodiment of the invention, wherein FIG. 1(a) shows a display screen of a moving picture consisting of first and second objects, and FIGS. 1(b) and 1(c) show data structures of coded image signals corresponding to the first and second objects, respectively.

FIGS. 10(a)–10(c) are diagrams for explaining how to access image data on Internet being an example of a conventional network system, wherein FIG. 10(a) shows a screen of a Hypertext file (home page), 10(b) shows description in the Hypertext file, and 10(c) shows a display screen of a moving picture.

DETAILED DESCRIPTION OF THE PREFERRED EMBODIMENTS

Embodiment 1

Figure 1:
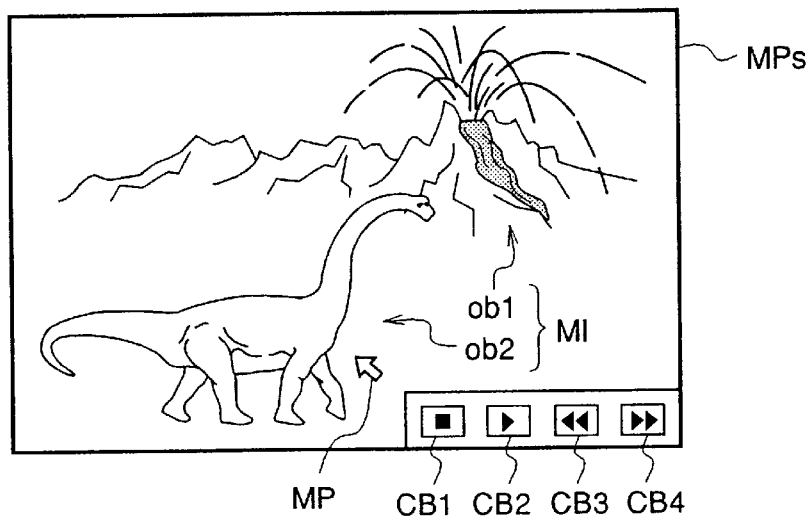
Figure 1:
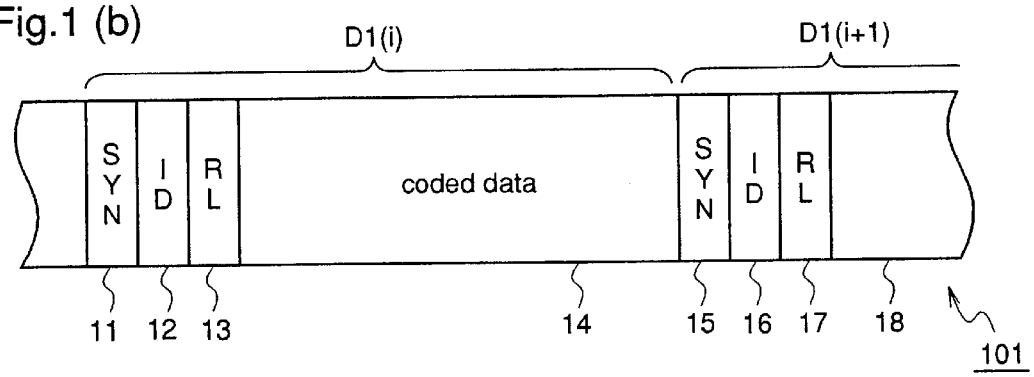
Figure 1:
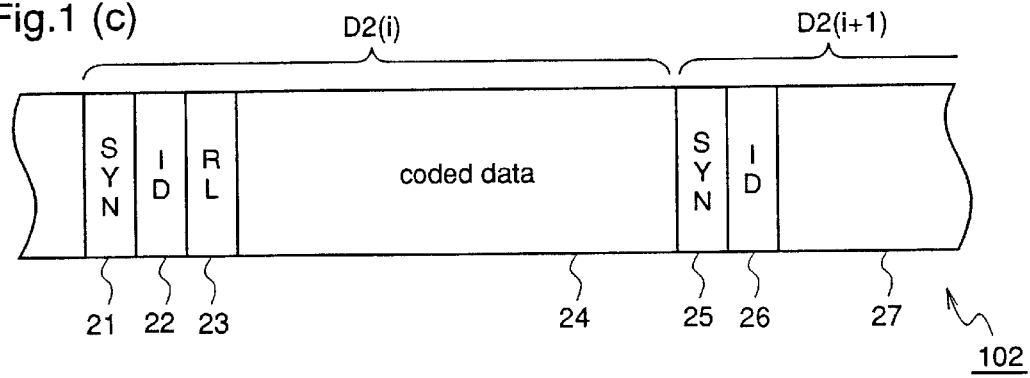

FIGS. 1(a)–1(c) are diagrams for explaining an image transmission method according to a first embodiment of the invention. FIG. 1(a) shows a display screen MPs of a moving picture MI comprising a plurality of objects, and FIGS. 1(b) and 1(c) show data structures of coded image signals corresponding to a first object (background) ob1 and a second object (foreground) which are constituents of the moving picture MI, respectively.

Figure 10:
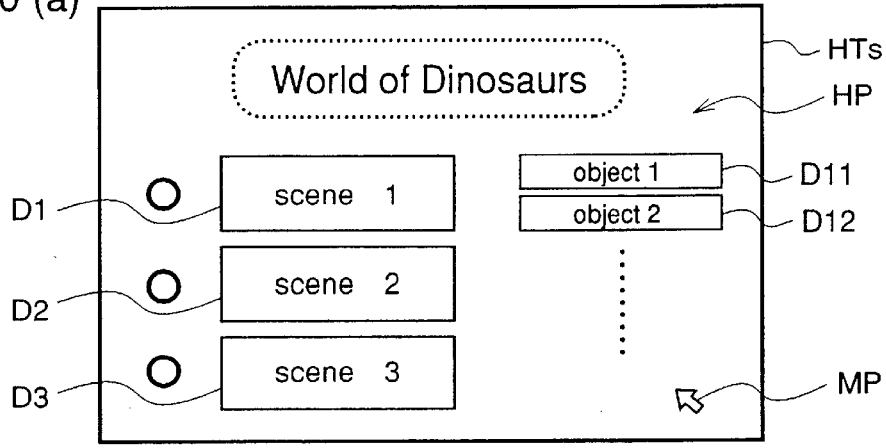
Figure 10:
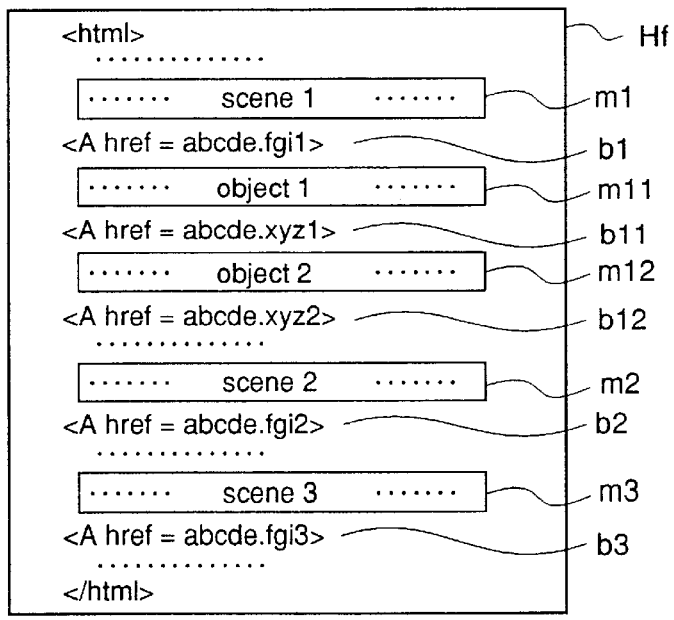
Figure 10:
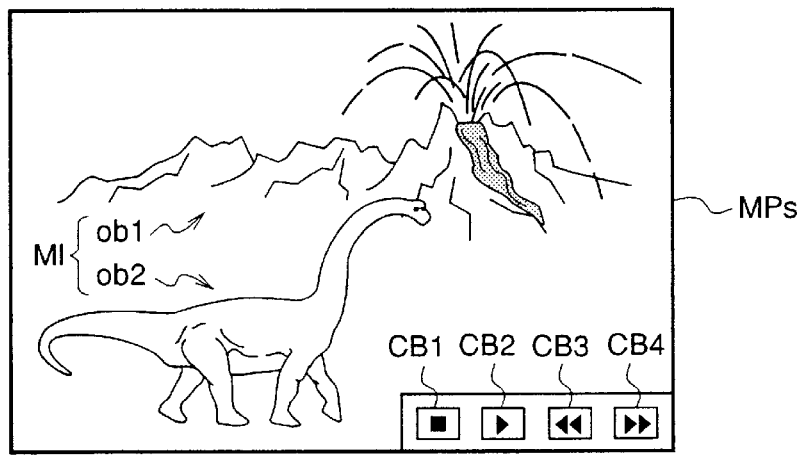

The image transmission method according to this first embodiment is, for example, to transmit digital image signals corresponding to the first and second objects ob1 and ob2 which are constituents of the moving picture MI. In this method, coded data are generated by coding image signals corresponding to the respective objects ob1 and ob2. These coded data corresponding to the respective objects are given locational information showing resource locations of relevant data relating to the respective objects, and transmitted as coded image signals. In FIG. 1(a), the same reference characters as in FIG. 10(c) designate the same parts. It is to be noted that the coded image signals mentioned above are obtained by a compressive coding method on the basis of MPEG1 standard.

Hereinafter, a description is given of the data structures of coded image signals corresponding to the first and second objects ob1 and ob2 to be transmitted by the image transmission method according to this first embodiment.

As shown in FIG. 1(b), a coded bit stream 101 constituting the coded image signal corresponding to the first object ob1 consists of a plurality of unit bit stream $D1(k)$ [k=1, 2, . . . ,i, i+1, . . . ,n (i,n=positive integer)] corresponding to respective frames.

For example, a unit bit stream $D1(i)$ corresponding to the i-th frame consists of a synchronous bit string 11 being a synchronous signal corresponding to the frame, an identification bit string 12 being an object identifier ID for identifying the first object ob1, a location bit string 13 being locational information RL showing resource locations of relevant data relating to the first object ob1, and a display bit string 14 being display information for image display of the first object ob1 (coded data). Likewise, a unit bit stream $D1(i+1)$ corresponding to the (i+1)th frame consists of a synchronous bit string 15, an identification bit string 16, a location bit string 17, and a display bit string 18. In the coded bit stream 101, the location bit string is given to every unit bit stream (display bit string) each corresponding to a frame.

Further, as shown in FIG. 1(c), a coded bit stream 102 constituting the coded image signal corresponding to the second object ob2 consists of a plurality of unit bit streams $D2(k)$ [k=1, 2, . . . ,i, i+1, . . . ,n (i,n=positive integer)] corresponding to respective frames.

For example, a unit bit stream $D2(i)$ corresponding to the i-th frame consists of a synchronous bit string 21 being a synchronous signal, an identification bit string 22 being an object identifier ID, a location bit string 23 being locational information RL showing resource locations of relevant data, and a display bit string 24 being information for image display (coded data). Further, a unit bit stream $D2(i+1)$ corresponding to the (i+1)th frame consists of a synchronous bit string 25, an indentification bit string 26, and a display bit string 27. In contrast with the unit bit stream $D2(i)$, the unit bit stream $D2(i+1)$ does not include a location bit string. Accordingly, in the coded bit stream 102, the location bit stream is given to every L unit bit stream (display bit strings) corresponding to L frames (L: integer not less than 2).

In the unit bit streams $D1(i)$, $D1(i+1)$, $D2(i)$, the synchronous strings 11, 15, 21 are located at the heads, followed by the identification bit strings 12, 16, 22, the location bit strings 13, 17 23, and the display bit strings 14, 18, 24, respectively, so that the strings in each unit bit stream are transmitted in this order. In the unit bit stream $D2(i+1)$, the synchronous bit string 25 is located at the head, followed by the identification bit string 26 and the display bit string 27, so that the strings in this bit stream are transmitted in this order. Each of the identification bit strings 12, 16, 22 and 26 is expressed by 5 bits, and each of the location bit strings 13, 17 and 23 is expressed by 64 bits.

Furthermore, since the respective unit bit streams $D1(k)$ in the coded bit stream 101 shown in FIG. 1(b) are compressed data of the same image sequence (object ob1), the identification bit strings serving as object identifiers ID in the respective unit bit streams $D1(k)$ have the same value.

Likewise, since the respective unit bit streams D2(k) in the coded bit stream 102 shown in FIG. 1(c) are compressed data of the same image sequence (object ob2), the identification bit strings serving as object identifiers ID in the respective unit bit streams D2(k) have the same value. The identification bit string in the coded bit stream 101 and the identification bit string in the coded bit stream 102 have different values so as to make a distinguish between the unit bit streams D1(k) corresponding to the object ob1 and the unit bit streams D2(k) corresponding to the object ob2.

Figure 9:
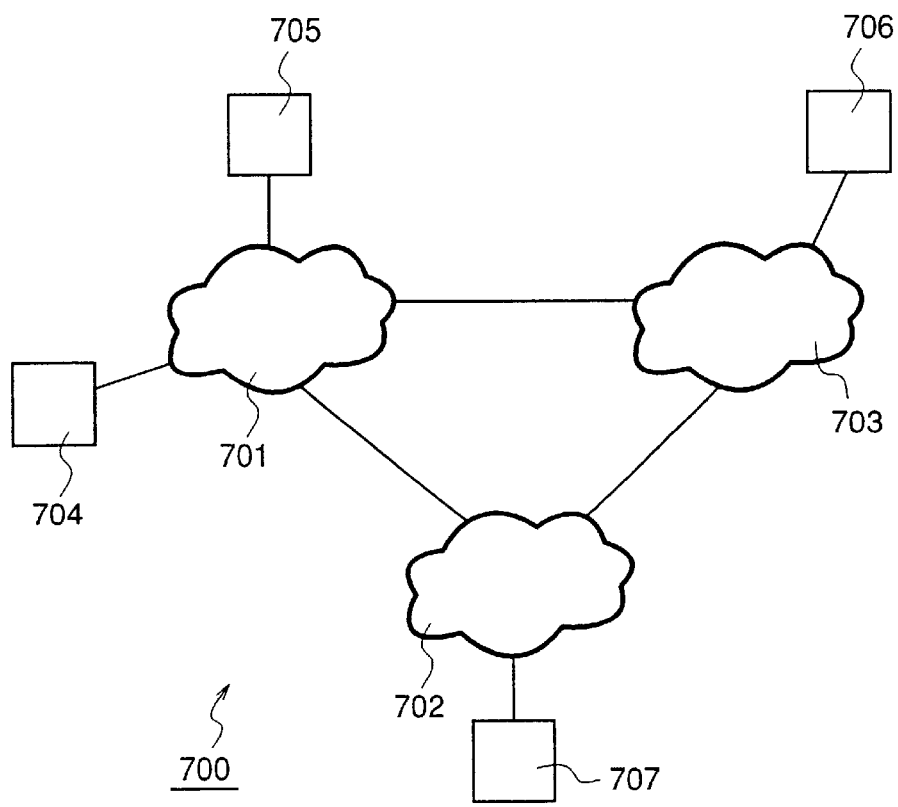
FIG. 9 is a schematic diagram for explaining a conventional network system.

It is assumed that the relevant data relating to the first and second objects ob1 and ob2 are data of other images or documents relating to these objects and, for example, the second object ob2 is an image of a dinosaur and the first object ob1 is an image of the habitat of the dinosaur, as shown in FIG. 1(a). In this case, relevant data of the first object ob1 may be a document explaining the habitat about its topography and climate, and relevant data of the second object ob2 may be an image explaining the ecology of the dinosaur or a document explaining the name or tribe of the dinosaur. These relevant data are possessed by the servers of the moving picture MI comprising the first and second object ob1 and ob2 or by other servers. For example, with reference to FIG. 9, an image explaining the ecology of the dinosaur is supplied from the server 705 while a document explaining the habitat of the dinosaur and a document explaining the name or tribe of the dinosaur are supplied from the server 706.

Furthermore, locational information of relevant data of the first and second objects ob1 and ob2 indicates locations of other data relating to the first and second objects. In this first embodiment, described as locational information are Internet names (resource locations of servers having relevant data) and remote paths (file names of relevant data in the servers).

In the first embodiment so constructed, when digital image signals corresponding to the first and second objects ob1 and ob2 constituting a moving picture are coded and transmitted, the coded bit streams 101 and 102 being coded image signals to be transmitted have data structures including location bit strings 13, 17 and 23 being locational information of relevant data of the respective objects, in addition to display bit strings 14, 18 24 and 27 being display information for image display of the respective objects. Therefore, on the reproduction end, the object can be directly correlated with the locational information of the relevant data. Therefore, it is not necessary to use a text file (e.g. Hypertext file) having a format different from that of an image file providing the display information. As a result, operability in accessing relevant data corresponding to the respective objects constituting the moving picture is improved. For example, the user can obtain the relevant data of the object ob1 (ob2) by only moving the mouse pointer MP to the display area of the object ob1 (ob2) on the display screen MPs of the moving picture MI and clicking the mouse.

Furthermore, in this first embodiment of the invention, the location bit string being locational information RL of relevant data is given to every frame in the coded bit stream of the first object while it is given to every L frames (L: integer not less than 2) in the coded bit stream of the second object. Therefore, according to various scenes of a moving picture in which scene change occurs, the locational information of relevant data of the objects constituting the moving picture can be changed. In this case, the relevant data vary according to various scenes of the moving picture.

With respect to each object as a constituent of the moving picture, the display information for displaying the object and the relevant data relating to the object are included in the same coded image signal, so that management of the locational information of relevant data corresponding to the object is facilitated.

Further, since the locational information of relevant data of each object and the coded image signal of the object are transmitted in one stream, it is impossible that only the locational information is lost due to transmission error, resulting in a reduction in loss of the locational information.

While in this first embodiment the locational information of relevant data is added to every L unit bit streams corresponding to L frames (L: integer not less than 2), the locational information may be given to a unit bit stream corresponding to a frame in which the value of the locational information changes.

In this case, a flag of one bit is given to each unit bit stream. When the flag is '1', locational information RL of relevant data is present and, when the flag is '0', locational information RL of relevant data is absent.

Furthermore, when the values of locational information of relevant data in the unit bit streams corresponding to all the frames are identical, locational information of relevant data may be given to only the head of the coded bit stream corresponding to a single image sequence, i.e., a single object. To be specific, in the coded bit stream 101 shown in FIG. 1(b), a location bit string serving as locational information of relevant data is placed before the unit bit stream corresponding to the head frame.

Although in this first embodiment emphasis has been placed on a case where a moving picture consists of two objects, the image transmission method of the present invention is not restricted to the first embodiment. It can be applied to a case where a moving picture consists of N objects (N: positive integer) with the same effects as mentioned above.

In this case, digital image signals corresponding to the first to N-th objects are coded to generated first to N-th coded image signals, and each of the first to N-th coded image signals is given locational information showing resource locations of relevant data relating to the corresponding object when it is transmitted.

Although in this first embodiment relevant data relating to an object are data other than the object, relevant data relating to an object may be display information for image display of the object.

Embodiment 2

Figure 2:
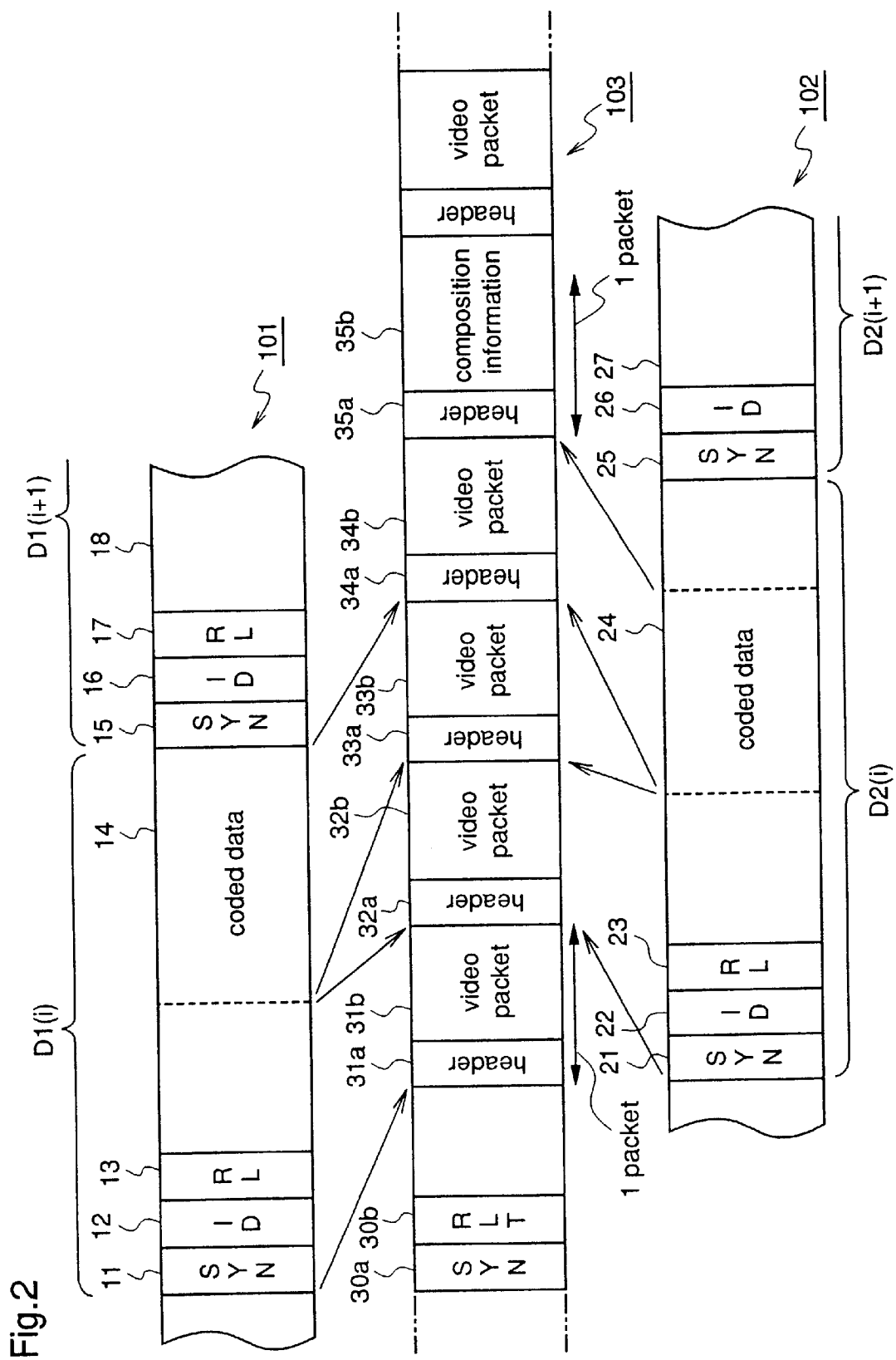
FIG. 2 is a diagram for explaining an image transmission method according to a second embodiment of the invention, illustrating a data structure of a coded and multiplexed signal obtained by multiplexing coded image signals corresponding to first and second objects.

FIG. 2 is a diagram for explaining an image transmission method according to a second embodiment of the invention.

In the image transmission method according to this second embodiment, digital image signals corresponding to first and second objects constituting a moving picture are coded and multiplexed to generate a coded and multiplexed signal, and then the coded and multiplexed signal is transmitted.

With reference to FIG. 2, a coded and multiplexed signal (coded and multiplexed bit stream) 103 to be transmitted by the image transmission method according to the second embodiment has a data structure consisting of display information for image display of the first and second objects; table information consisting of object indentifiers corresponding to the first and second objects and locational information of relevant data corresponding to the first and second information; and composition information used for composition of the first and second objects. In FIG. 2, coded bit streams 101 and 102 being coded image signals corresponding to the first and second objects have the same structures as those described for the first embodiment.

More specifically, the coded and multiplexed bit stream 103 constituting the coded and multiplexed signal consists of a synchronous bit string 30a being a synchronous signal corresponding to a moving picture, a table bit string 30b being the above-mentioned table information RLT, a plurality of video packets 31b~35b, and a plurality of headers 31a~35a corresponding to the video packets 31b~35b. The coded bit stream 101 constituting the coded image signal of the first object ob1 and the coded bit stream 102 constituting the coded image signal of the second object ob2 are divided into plural bit streams of prescribed code quantities, and these bit streams are arranged as the above-mentioned video packets in the coded and multiplexed bit stream 103.

For example, the coded bit stream D1(i) corresponding to the i-th frame of the first object ob1 is assigned to the video packets 31b and 33b, and the coded bit stream D2(i) corresponding to the i-th frame of the second object ob2 is assigned to, for example, the video packets 32b and 34b. The video packets 31b~35b are provided with headers 31a~35a, respectively, and these headers 31a~35a contain packet identifiers.

Each packet identifier is expressed by fixed-length coding of 6 bits. In order to distinguish between the video packets corresponding to the first object ob1 and the video packets corresponding to the second object ob2, the packet identifiers in the headers 31a and 33a are different from those in the headers 32a and 34a.

Further, the above-mentioned composition information is also arranged as a composition information packet 35b in the coded and multiplexed bit stream 103. This composition information packet 35b is given a header 35a, and the header 35a contains a packet identifier different from the packet identifier of the video packet.

Furthermore, locational information table information RLT comprising the table bit string 30b includes object identifiers of the respective objects and locational information of relevant data corresponding to the respective objects.

Figure 3:
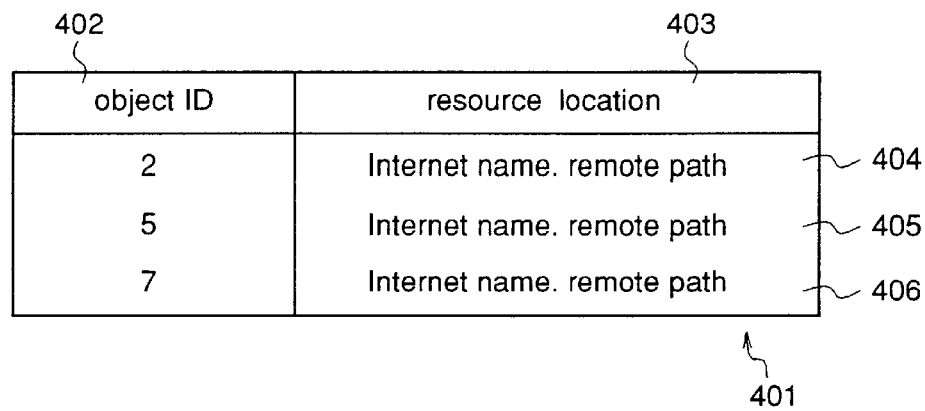
FIG. 3 is a diagram illustrating an example of a table showing locational information of relevant data in a coded image signal transmitted by the image transmission method according to the second embodiment.

FIG. 3 shows an example of a table 401 obtained from the locational information table information RLT, wherein numerical values of object identifiers (object ID) are described in the left-side column 402, and Internet names and remote paths 404–406 showing locational information (resource location) of relevant data of the respective objects (images) are described in the right-side column. On the table 401 shown in FIG. 3, the object ID of the first object ob1 is '2', and the object ID of the second object ob2 is '5'. When the moving picture includes a third object, the object ID of the third object is '7' as shown in FIG. 3.

Figure 4:
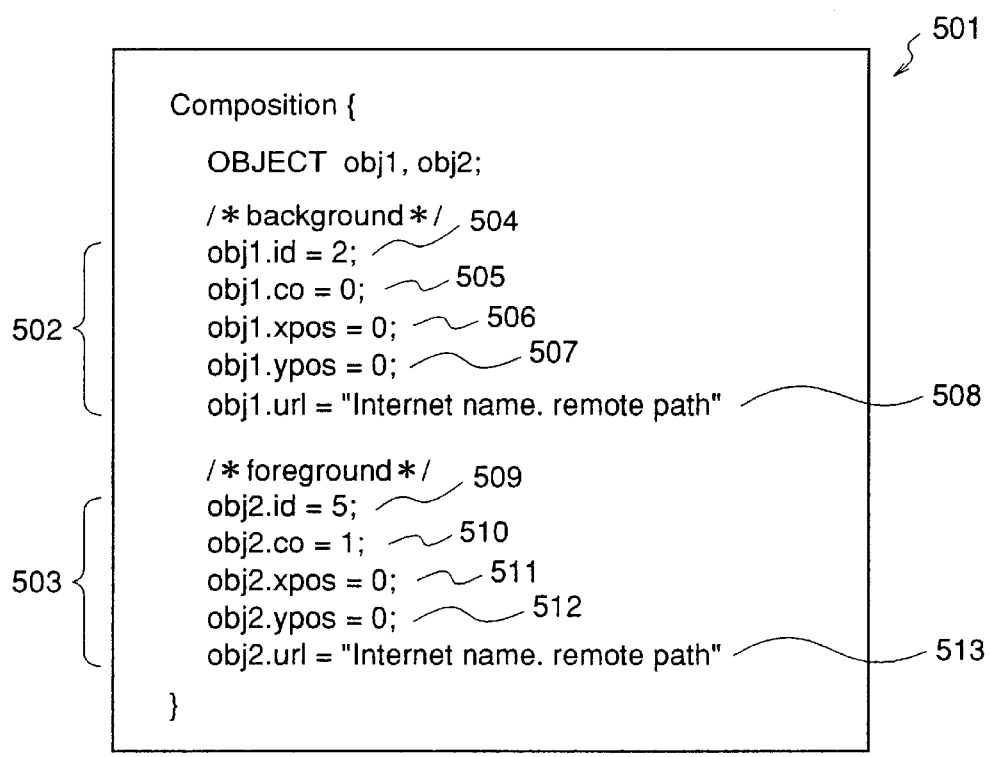
FIG. 4 is a diagram showing an example of composition information in a coded image signal transmitted by the image transmission method according to the second embodiment.

FIG. 4 shows an example of composition information 501 included in the coded bit stream 103 of the coded and multiplexed signal. The composition information 501 contains composition data 502 relating to the first object (obj1) and composition data 503 of the second object (obj2).

Described as the composition data 502 of the first object are as follows: the above-mentioned object identifier (id-2) 504; depth information showing whether the object (image) is background or foreground (co=0) 505; horizontal positioning information, i.e., positional information of the first object in the horizontal direction on the moving picture screen MPs (xpos=0) 506; vertical positioning information, i.e., positional information of the first object in the vertical direction on the moving picture screen MPs (ypos=0) 507; and locational information of relevant data (url) 508.

Described as the composition data 503 of the second object are as follows: an object identifier (id=5) 509; depth information (co=1) 510; horizontal positioning information (ypos=0) 511; vertical positioning information (ypos=0) 512; and locational information of relevant data (url) 513.

As described above, in this second embodiment of the invention, a coded image signal corresponding to the first object ob1 and a coded image signal corresponding to the second object ob2 are multiplexed for transmission, and the coded and multiplexed signal to be transmitted has the data structure including table information comprising object identifiers of the respective objects and locational information showing resource locations or relevant data of the objects. Therefore, in addition to the effects of the first embodiment, the reproduction end can grasp correspondence between each object and the locational information of relevant data corresponding to the object, according to the table information being a portion of the coded and multiplexed signal.

Furthermore, since the composition information included in the coded and multiplexed signal also has the object identifiers of the respective objects and locational information (resource locations) of relevant data corresponding to the respective objects, transmission of the locational information of relevant data is carried out with higher reliability, thereby preventing the locational information of relevant data from being lost during the transmission.

In this second embodiment, the coded and multiplexed signal has the data structure including the table information that consists of object identifiers of the respective objects and the locational information of relevant data of the objects and, further, the composition information included in the coded and multiplexed signal has the object identifiers and the locational information of relevant data. However, when the composition information includes the object identifiers and the locational information of relevant data of the objects, the coded and multiplexed signal does not have to include the table information. When the coded and multiplexed signal includes the table information, the composition information does not have to include the object identifiers and the locational information of relevant data.

Although in this second embodiment emphasis has been placed on a case where a moving picture consists of two objects, the image transmission method of the present invention is not restricted to this second embodiment. It can be applied to a case where a moving picture consists of N objects (N: positive integer) with the same effects as mentioned above.

In this case, digital image signals corresponding to the first to N-th objects are coded, and first to N-th coded image signals are multiplexed to generate a single coded and multiplexed signal. This coded and multiplexed signal includes a table consisting of identifiers of the first to N-th objects and locational information of relevant data of the first to N-th objects, and the above-mentioned composition information comprises, at least, the first to N-th object identifiers and the locational information of relevant data of the first to N-th objects.

Although in the first and second embodiments of the invention relevant data relating to an object are data other than the object, relevant data relating to an object may be display information for image display of the object.

Embodiment 3

Figure 5:
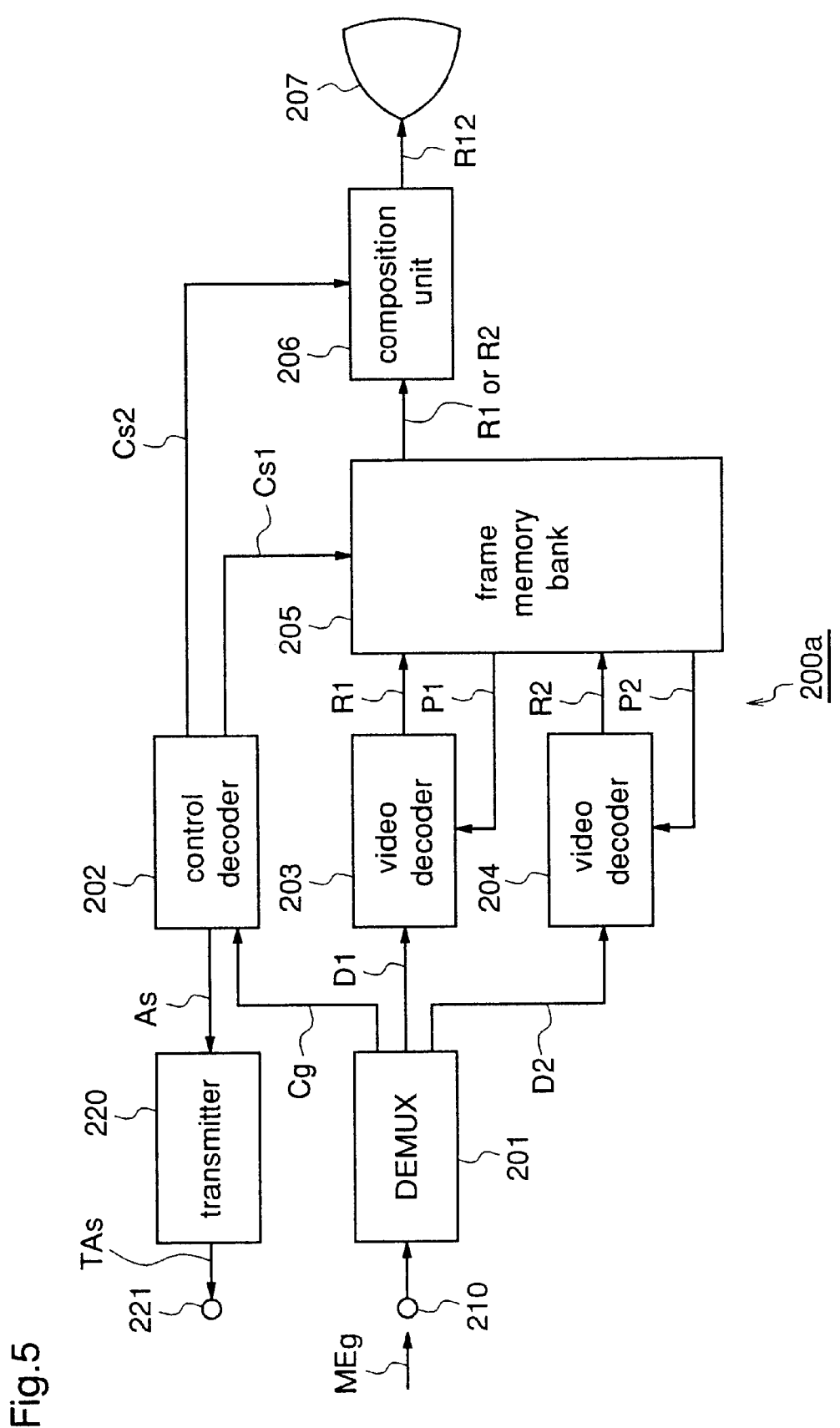
FIG. 5 is a block diagram illustrating a digital image decoding apparatus according to a third embodiment of the invention.

FIG. 5 is a block diagram illustrating a digital image decoding apparatus 200a according to a third embodiment of the present invention.

The digital image decoding apparatus 200a receives a coded and multiplexed signal MEg including composition information and display information (coded data) as described for the second embodiment of the invention, and reproduces a moving image comprising plural objects.

To be specific, the digital image decoding apparatus 200a includes a demultiplexer (DEMUX) 201 that extracts coded data D1 and D2 corresponding to first and second objects and composition information Cg from the coded and multiplexed signal MEg input to an input terminal 210; a control decoder 202 that generates control signals Cs1 and Cs2 according to the composition information Cg and generates an access signal As for accessing relative data relating to the respective objects; first and second video decoders that receive the coded data D1 and D2 corresponding to the first and second objects and decode these data to generate first and second reproduced image signals R1 and R2, respectively; and a frame memory bank 205 that stores the reproduced image signals R1 and R2 according to the control signal Cs1. The image decoding apparatus 200a performs decoding corresponding to the coding method based on MPEG1, and the frame memory bank 205 supplies prediction signals P1 and P2 used for the decoding to the video decoders 203 and 204, respectively. However, when the video decoders 203 and 204 include frame memories, it is not necessary to supply prediction signals from the frame memory bank 205 to the decoders 203 and 204.

The image decoding apparatus 200a further includes a composition unit 206 that composites the first and second reproduced image signals R1 and R2 stored in the frame memory bank 205 according to the control signal Cs2 from the control decoder 202 to generate composite image signal R12; and a display unit 207 that displays the composite image signal R12 from the composition unit 206 as an image.

Furthermore, the image decoding apparatus 200a includes a transmitter 220 that transmits the access signal Ag from the control decoder 202 as a transmission signal TAs.

Although the image decoding apparatus 200a includes two video decoders to facilitate the description of the apparatus, an actual image decoding apparatus may include more video decoders. Alternatively, an image decoding apparatus including a single video decoder is also within the scope of the invention. When image synthesis processing is not required, the composition unit can be dispensed with.

The data structure of the coded and multiplexed signal MEg is identical to that of the coded and multiplexed signal 103 transmitted by the image transmission method according to the second embodiment. However, specific coded data are different from those of the second embodiment. That is, the first object is an image of a fish and the second object is an image of the sea in this third embodiment whereas the first object is an image of habitat of a dinosaur and the second object is an image of the dinosaur in the second embodiment. Relevant data of the first object, i.e., the fish, may be its name, ecology and the like. Thus, relevant data of an image are data of another image or document relating to the image, and individual objects constituting a moving picture have different relevant data. For example, when an object is an image of Tokyo Olympic, considered as relevant data of the image of Tokyo Olympic are images of the history of Olympic, the situation of Japan during Tokyo Olympic and the like. These data are possessed by the same server or by different servers, as already described for the second embodiment. For example, with reference to FIG. 9, the image of Tokyo Olympic is supplied from the server 705 while the image of the history of Olympic is supplied from the server 706.

A description is given of the operation.

When the coded and multiplexed signal MEg including the above-mentioned coded data and composition information is input to the input terminal 210 of the image decoding apparatus 200a, the demultiplexer 201 extracts composition information Cg and coded data D1 and D2 corresponding to the first and second objects from the coded and multiplexed signal MEg, and sends the composition information Cg to the control decoder 202. The control decoder 202 generates control signals Cs1 and Cs2 and an access signal As according to the composition information Cg. The access signal As is generated according to locational information of relevant data included in the composition information Cg.

On the other hand, the coded data D1 and D2 corresponding to the first and second objects, separated from the coded and multiplexed signal MEg, are input to the video decoders 203 and 204, respectively. The video decoders 203 and 204 decode the coded data D1 and D2, respectively, to generate reproduced image signals R1 and R2 corresponding to the respective objects. These signals R1 and R2 are stored in the frame memory bank 205. Although the video decoder according to this third embodiment adopts, for decoding process, inter-frame motion compensation and discrete cosine transformation method represented by the coding method based on MPEG 1, other signal transformation methods may be adopted for the decoding process of the video decoder.

According to the control signal Cs1 from the control decoder 202, reproduced image signals of objects to be subjected to composition are read from the frame memory bank 205 into the composition unit 206. The composition unit 206 composites the reproduced image signals from the frame memory bank 205 according to the control signal Cs2 from the control decoder 202 to generate a composite image signal R12, followed by image display of the composite image signal R12 on the display unit 207.

The transmitter 220 receives the access signal As for receiving relevant data of the specified objects, which has been generated in the control decoder 202, and outputs the signal as a receiving request signal (transmitted signal) TAs from the transmitting terminal 221 to the outside.

Hereinafter, composition processing according to the control signals Cs1 and Cs2 from the control decoder 202 will be conceptually described using FIG. 6.

To facilitate the description, it is assumed that an image of a fish is reproduced by the first coded data R1 included in the coded and multiplexed signal MEg as a foreground image (first object) 51, an image of the sea is reproduced by the second coded data R2 included in the coded and multiplexed signal MEg as a background image (second object) 52, and an image of the fish swimming in the sea is displayed as a moving picture 53 consisting of the first and second objects. FIG. 6 schematically shows the process of compositing the first and second objects.

As described above, the frame memory bank 205 contains the first and second reproduced image signals R1 and R2 corresponding to the first and second objects 51 and 52, reproduced by the video decoders 203 and 204, respectively. According to the control signal Cs1 from the control decoder 202, reproduced image signals of desired objects (i.e., the first and second reproduced image signals R1 and R2 corresponding to the first and second objects 51 and 52 in this embodiment are read from the frame memory bank 205 into the composition unit 206.

The composition unit 206 composites the first and second reproduced image signals R1 and R2 according to the control signal Cs2 from the control decoder 202 to generate a composite image, i.e., a reproduced composite signal corresponding to the moving picture. At this time, the control signal Cs2 from the control decoder 202 indicates that the first object is a foreground image and the second object is a background image.

Next, a description is given of composition processing on the bases of the composition information shown in FIG. 4 using the control decoder 202 and the composition unit 206.

Figure 6:
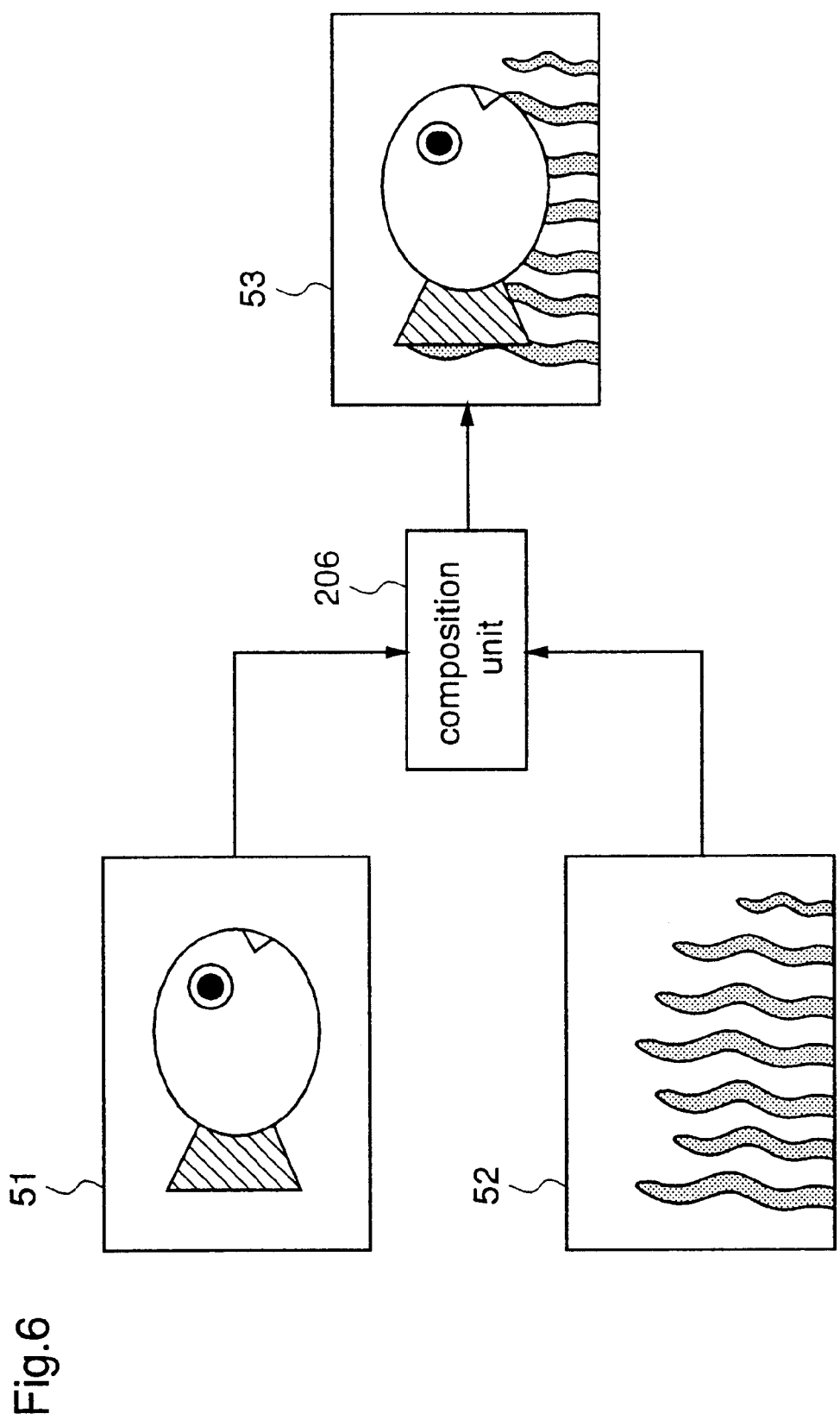
FIG. 6 is a schematic diagram for explaining composition of objects by the digital image decoding apparatus according to the third embodiment of the invention.

To facilitate the description, it is assumed that, in the composition information 501 shown in FIG. 4, composite data 502 of the first object corresponds to composite data about the image of a fish 51 shown in FIG. 6, and composite data 503 of the second object corresponds to composite data about the image of the sea 52 shown in FIG. 6. Each of the composite data 502 and 503 includes information (not shown) relating to the composition time of the object i.e., timing at which the object is composited with another object).

The control decoder 202 is supplied with the table bit string 30b being the table information RLT and the composition information packet 35b shown in FIG. 2 from the demultiplexer 201 and, furthermore, it is supplied with the location bit strings 13, 17 and 23 being the locational information RL of relevant data in the coded bit streams of the respective objects. The control decoder 202 manages the locational information of relevant data corresponding to a composite image comprising an object or plural objects.

On the other hand, the composition unit 206 adjusts a reference time corresponding to the composition time of each object to a prescribed time of a clock included in the image decoding apparatus. When the clock shows the composition time of each object, the composition unit 206 reads image data (reproduced image signal) of the object specified by the object identifier from the frame memory bank 205. Thereafter, the composition unit 206 composites the read-out image data according to the depth of the object and the information about positioning of the object, which correspond to the composition information.

The depth information (co=0) in the composition information shows that the object is a background image to be positioned deepest in the composite image, and the depth information (co=1) shows that the object is a foreground image to be positioned before the object having the depth information (co=0). The horizontal positioning information (xpos) shows the position of the object in the horizontal direction on the display screen, and the vertical positioning information (ypos) shows the position of the object in the vertical direction on the display screen. Accordingly, the position on the display screen is represented by a position coordinate (xpos,ypos), and a position coordinate (0,0) shows the center position of the display screen.

The control decoder 202 decides an object the requires relevant data according to other information included in the composition information, and outputs an access signal As for accessing the relevant data of the object toward the transmitter 220. Receiving the access signal As, the transmitter 220 outputs a receiving request signal TAs toward the server described in the locational information of the relevant data of the object. Receiving the request signal TAs, the server sends the relevant data to the input terminal 210 of the image decoding apparatus 220a according to the remote path (file name) described in the locational information of the relevant data. In this third embodiment, communication between the image decoding apparatus 220a and the server utilizes communication protocol called UDP.

As described above, according to the third embodiment of the invention, the image decoding apparatus 200a includes the demultiplexer 201 that receives a coded and multiplexed signal MEg obtained by coding and multiplexing a digital image signal corresponding to plural objects and extracts, from the coded and multiplexed signal, coded data D1 and D2 corresponding to the respective objects, locational information of relevant data corresponding to the respective objects, and composition information for compositing the plural objects; and the control decoder 202 that controls reproduction and display of a moving picture comprising the plural objects according to the locational information of relevant data and the composition information. Therefore, when a moving picture comprising the plural objects is reproduced and displayed by decoding the coded and multiplexed signal, relevant data corresponding to required objects can be automatically obtained by the control decoder 202 according to the locational information thereof.

Embodiment 4

Figure 7:
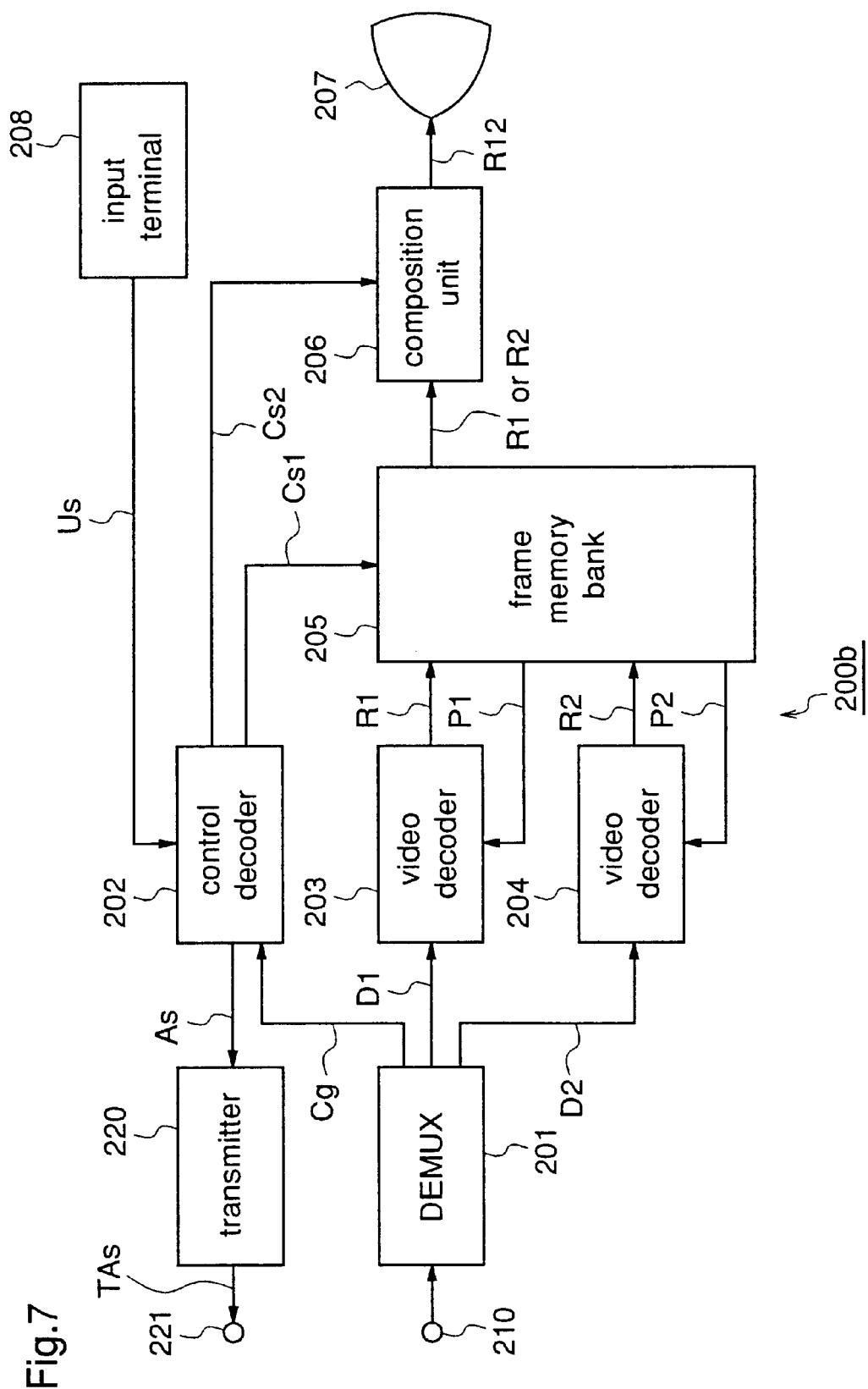
FIG. 7 is a block diagram illustrating a digital image decoding apparatus according to a fourth embodiment of the invention.

FIG. 7 is a block diagram illustrating a digital image decoding apparatus 200b according to a fourth embodiment of the invention.

The digital image decoding apparatus 200b according to this fourth embodiment is identical to the digital image decoding apparatus 200a according to the third embodiment except that it further includes an input terminal unit 208 with which the user gives a command signal to the control decoder 202, for example, a command signal to generate an access signal for accessing relevant data. Other parts and operations thereof are identical to those already described for the third embodiment. Although a mouse is used as the input terminal unit 208 in this fourth embodiment, a remote controller or the like may be used in place of the mouse.

In the digital image decoding apparatus 200b so constructed, when the user specifies a described object from plural objects constituting a moving picture and requests relevant data of the object using the input terminal unit 208, a command signal Us is sent to the control decoder 202. In response to the command signal Us, the control decoder 202 outputs an access signal As for accessing the relevant data of the object toward the transmitter 220. In response to the access signal As, the transmitter 220 outputs a receiving request signal TAs to the server described in the locational information of the relevant data. The server receiving the request signal TAs sends the relevant data of the desired object to the digital image decoding apparatus 200b.

As described above, according to the fourth embodiment of the invention, the image decoding apparatus 200b includes the demultiplexer 201 that receives a coded and multiplexed signal obtained by coding and multiplexing a digital image signal corresponding to plural objects and extracts, from the coded and multiplexed signal, coded data corresponding to the respective objects, locational information of relevant data corresponding to the respective objects, and composition information for compositing the plural objects; the control decoder 202 that controls reproduction and display of a moving picture comprising the plural objects according to the locational information of relevant data and the composition information; and the input terminal unit (mouse) 208 with which the user can specify a desired object from the objects constituting the moving image on the display screen. Therefore, the user can obtain relevant data of a desired object by only specifying the object with the mouse 208 on the screen where the moving picture comprising plural objects is displayed by decoding of the coded and multiplexed signal. As a result, when the user requires relevant data of a desired object, this apparatus saves the user the trouble of switching the moving picture display screen to the text file display screen.

Further, since the locational information of relevant data of objects are added to the coded data of the objects, the locational information of relevant data is not lost as long as the coded data are not lost.

Furthermore, when a new object is added to the moving picture obtained as described above by editing the moving picture, since the locational information of relevant data of the respective objects constituting the moving picture can be changed by changing the coded image signal of the moving picture, management of the locational information is facilitated.

Further, in the third and fourth embodiments, the coded and multiplexed signal MEg has a data structure including three pieces of additional information, i.e., locational information table information RLT, composition information, and locational information RL of relevant data. However, the coded and multiplexed signal MEg may have a data structure including one of the three pieces of additional information.

Although in the third and fourth embodiments of the invention relevant data relating to an object are data other than the object, relevant data relating to an object may be display information for image display of the object.

In the aforementioned embodiments of the invention, emphasis has been placed on coded image signals obtained by coding digital image signals corresponding to plural objects constituting a moving picture. However, the present invention can be applied to coded audio signals obtained by coding audio signals including sound or speech.

When programs for implementing the image transmission methods and the image decoding apparatuses according to the aforementioned embodiments are recorded on data recording media such as floppy disks, the processes according to the respective embodiments can be easily realized in individual computer systems.

Figure 8:
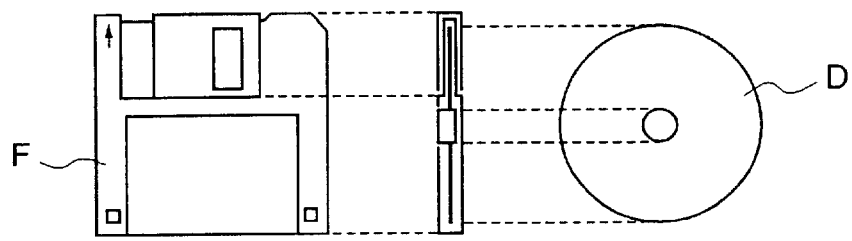
FIGS. 8(a)–8(c) are diagrams for explaining a data recording medium which contains a program for implementing image processing by a computer, according to any of the above-mentioned data structures of coded image signals, image transmission methods, and image decoding apparatuses.
Figure 8:
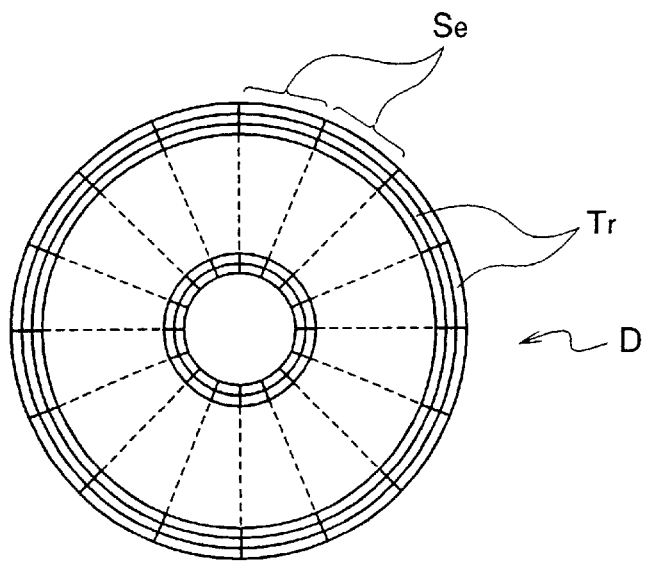
Figure 8:
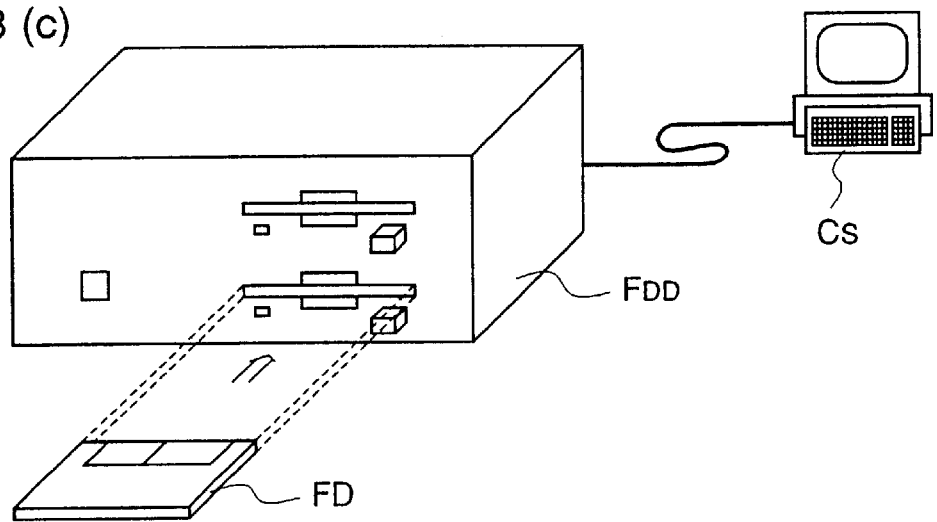

FIGS. 8(a)–8(c) are diagrams for explaining a case where an image transmission process according to any of the above-mentioned image transmission methods or an image decoding process by any of the above-mentioned image decoding apparatuses is realized by a computer system using a floppy disk in which a program corresponding to the process is recorded.

FIG. 8(a) shows a front view of a floppy disk FD, a cross-sectional view thereof, and a floppy disk body D being a recording medium. FIG. 8(b) shows an example of a physical formation of the floppy disk body D. The floppy disk body D is contained in a case F. On the surface of the disk body D, a plurality of tracks Tr are formed concentrically from the outer circumference of the disk toward the inner circumference. Each track is divided into 16 sectors in the angular direction. Accordingly, on the floppy disk body D having the above-mentioned program, data as the program are recorded on assigned regions of the floppy disk body D.

FIG. 8(c) shows a structure for performing recording and reproduction of the program to the floppy disk FD, wherein Cs is a computer system and FDD is a floppy disk drive. When the program is recorded on the floppy disk FD, data as the program are written in the floppy disk FD from the computer system Cs through the floppy disk drive FDD. When the above-mentioned image transmission method or image decoding apparatus is constructed in the computer system Cs from the program in the floppy disk FD, the program is read from the floppy disk FD by the floppy disk drive FDD and transmitted to the computer system Cs.

Although in the above description emphasis has been placed on a data recording medium containing a program for performing data transmission or data decoding according to any of the aforementioned embodiments, a data recording medium containing a coded image signal having a data structure according to any of the first and second embodiments (coded bit stream or coded and multiplexed bit stream) is also within the scope of the invention. Further, coded signals contained in these data recording media may be coded audio signals as mentioned above.

Although in the above description an emphasis has been placed on image processing by a computer system using a floppy disk as a data recording medium, similar image processing can be carried out using other recording media, such as optical disk, IC card, and ROM cassette.

What is claimed is:

1. A data structure for coding and transmitting digital image signals corresponding to plural objects constituting a moving picture:

wherein a coded image signal obtained by coding the digital image signal corresponding to each object includes;

display information for image display of the corresponding object, locational information showing a location of an information terminal, in which relevant data relating to the corresponding object is stored, among a plurality of information terminals which are mutually connected on a network, and said coded image signal has an independent structure for each object unit so that transmitting processing in object units between a plurality of information terminals which are mutually connected in a network and decoding processing in object units at the respective information terminals are performed.

2. A method for transmitting digital image signals corresponding to plural objects constituting a moving picture, said method including the steps of:

generating a coded image signal having an independent data structure for each object unit so that transmitting processing object units between a plurality of information terminals which are mutually connected in a network and decoding processing in object units at the respective information terminals are performed by coding the image signal corresponding to each object; and transmitting the coded image signal corresponding to each object after adding locational information showing a location of an information terminal in the network in which relevant data relating to the object is stored.

3. An image decoding apparatus which receives a coded image signal having an independent data structure for each object unit so that transmitting processing in object units between a plurality of information terminals which are mutually connected in a network and decoding processing in object units at the respective information terminals are performed which is obtained by coding digital image signals corresponding to plural objects constituting a moving picture, said coded image signal including display information for image display of the respective objects and locational information showing a location of an information terminal, in which relevant data relating to the respective objects are stored, and performs a prescribed decoding process to the coded image signal, said apparatus including:

transmission means for transmitting an access signal for accessing the relevant data to an information terminal in the network which is located in a position shown by the locational information, according to the locational information of the relevant data; and a decoding unit for decoding the display information.

4. The apparatus of claim 3 wherein a coded bit stream constituting the coded image signal corresponding to each object has a data structure in which a location bit string constituting the locational information of relevant data is given to every L display bit strings constituting the display information and corresponding to L frames (L: integer, L≧1).

5. The apparatus of claim 3 wherein a coded bit stream constituting the coded image signal corresponding to each object comprises a plurality of display bit strings constituting the display information corresponding to each object, and a location bit string constituting the locational information of relevant data corresponding to each object, said location bit string being located at the head of the coded bit stream.

6. An image decoding apparatus which receives a coded image signal having an independent data structure for each object unit so that transmitting processing in object units between a plurality of information terminals which are mutually connected in a network and decoding processing in object units at the respective information terminals are performed which is obtained by coding digital image signals corresponding to plural objects constituting a moving picture, said coded image signal including display information for image display of the respective objects and table information comprising object identifiers for identifying the respective objects and locational information showing a location of an information terminal, in which relevant data relating to the corresponding objects is stored, and performs a prescribed decoding process to the coded image signal, said apparatus including:

transmission means for transmitting an access signal for accessing the relevant data to an information terminal in the network which is located in a position shown by the locational information, according to the locational information of the relevant data; and a decoding unit for decoding the display information.

7. An image decoding apparatus which receives a coded image signal having an independent data structure for each object unit so that transmitting processing in object units between a plurality of information terminals which are mutually connected in a network and decoding processing in object units at the respective information terminals are performed which is obtained by coding digital image signals corresponding to plural objects constituting a moving picture, said coded image signal including display information for image display of the respective objects and composition information used for composition of plural objects, and performs a prescribed decoding process to the coded image signal, said apparatus including:

transmission means for transmitting an access signal for accessing the relevant data to an information terminal in the network which is located in a position shown by the locational information, according to locational information showing a location of an information terminal in the network in which the relevant data relating to each object is stored, said locational information being included in the composition information corresponding to each object together with an object identifier for identifying the object; and a decoding unit for decoding the display information.

8. A data structure for coding and transmitting digital signals corresponding to plural pieces of individual information constituting a signal information group:

wherein a coded image signal obtained by coding the digital signal corresponding to each individual information includes;

a reproduction signal for reproducing the corresponding individual information, locational information showing a location of an information terminal, of which relevant data relating to the corresponding individual information is stored, among a plurality of information terminals which are mutually connected on a network, and said coded image signal has an independent structure for an individual information unit so that transmitting processing in object units between a plurality of information terminals which are mutually connected in a network and decoding processing in individual information units at the respective information terminals are performed.

9. A data recording medium containing a program for making a computer perform an image signal transmission, wherein said program is constructed so that the computer performs an image signal transmission according to the image transmission method of claim 2.

10. A data recording medium containing a program for making a computer program perform an image signal transmission, wherein said program is constructed so that the computer performs the decoding processing in the image decoding apparatus of claim 3.

11. A data structure for coding and transmitting digital image signals corresponding to plural objects constituting a moving picture:

wherein a coded image signal obtained by coding the digital image signal corresponding to each object includes;

display information for image display of the corresponding object, locational information showing a location of an information terminal, in which relevant data relating to the corresponding objects is stored, among a plurality of information terminals which are mutually connected on a network, and said coded image signal has an independent structure for each object unit so that transmitting processing in object units between a plurality of information terminals which are mutually connected in a network and decoding processing in object units in the respective information terminals are performed.

12. A method of transmitting digital image signals corresponding to plural objects constituting a moving picture, said method including the steps of:

generating a coded signal having an independent data structure for each object unit so that transmitting processing in object units between a plurality of information terminals which are mutually connected in a network and decoding processing in object units at the respective information terminals are performed which is obtained by coding the image signal corresponding to each object; and transmitting the coded image signal corresponding to each object after adding locational information showing a location of an information terminal in the network in which display information for displaying the object is stored, to the coded image signal.

13. An image decoding apparatus which receives a coded image signal having an independent data structure for each object unit so that transmitting processing in object units between a plurality of information terminals which are mutually connected in a network and decoding processing in object units at the respective information terminals are performed which is obtained by coding digital image signals corresponding to plural objects constituting a moving picture, said coded image signal including display information for image display of the respective objects and locational information showing a location of an information terminal, in which the display information is stored, and performs a prescribed decoding process to the coded image signal, said apparatus including:

transmission means for transmitting an access signal for accessing the display information to an information terminal in the network which is located in a position shown by the locational information, according to the locational information of the display information; and a decoding unit for decoding the display information.

14. The apparatus of claim 13 wherein a coded bit stream constituting the coded image signal corresponding to each object has a data structure in which a location bit string constituting the locational information of the display information is given to every L display bit strings constituting the display information and corresponding to L frames (L: integer, L≧1).

15. The apparatus of claim 13 wherein a coded bit stream constituting the coded image signal corresponding to each object comprises a plurality of display bit strings constituting the display information corresponding to each object, and a location bit string constituting the locational information of the display information of each object, which location bit string is located at the head of the coded bit stream.

16. An image decoding apparatus which receives a coded image signal having an independent data structure for each object unit so that transmitting processing in object units between a plurality of information terminals which are mutually connected in a network and decoding processing in object units at the respective information terminals are performed which is obtained by coding digital image signals corresponding to plural objects constituting a moving picture, said coded image signal including display information for image display of the respective objects and table information comprising object identifiers for identifying the respective objects and locational information showing a location of an information terminal, in which the display information is stored, and performs a prescribed decoding process to the coded image signal, said apparatus comprising:

transmission means for transmitting an access signal for accessing the display information to an information terminal in the network which is located in a position shown by the locational information, according to the locational information of the display information; and a decoding unit for decoding the display information.

17. An image decoding apparatus which receives a coded image signal having an independent data structure for each object unit so that transmitting processing in object units between a plurality of information terminals which are mutually connected in a network and decoding processing in object units at the respective information terminals are performed which is obtained by coding digital image signals corresponding to plural objects constituting a moving picture, said coded image signal including display information for image display of the respective objects and composition information used for composition of plural objects, and performs a prescribed decoding process to the coded image signal, said apparatus comprising:

transmission means for transmitting an access signal for accessing the display information to an information terminal in the network which is located in a position shown by the locational information, according to the locational information showing a location of an information terminal in the network, in which the display information of each object, said locational information being included in the composition information corresponding to each object together with an object identifier for identifying the object; and a decoding unit for decoding the display information.

18. A data structure for coding and transmitting digital signals corresponding to plural pieces of individual information constituting a single information group:

wherein a coded image signal obtained by coding the digital signal corresponding to each individual information includes;

a reproduction signal for reproducing the corresponding individual information, locational information showing a location of an information terminal, in which the reproduction signal of the corresponding individual information is stored, among a plurality of information terminals which are mutually connected on a network, and said coded image signal has an independent structure for an individual information unit so that transmitting processing in object units between a plurality of information terminals which are mutually connected in a network and decoding processing in individual information units at the respective information terminals is preferred.

19. A data recording medium containing a program for making a computer perform an image signal transmission, wherein said program is constructed so that the computer performs an image signal transmission according to the image transmission method of claim 12.

20. A data recording medium containing a program for making a computer perform an image signal transmission, wherein said program is constructed so that the computer performs the decoding processing in the image decoding apparatus of claim 13.

* * * * *